(12) United States Patent
Tepavcevic et al.

(10) Patent No.: US 11,121,402 B2
(45) Date of Patent: Sep. 14, 2021

(54) AQUEOUS MANGANESE ION BATTERY

(71) Applicant: UCHICAGO ARGONNE, LLC, Chicago, IL (US)

(72) Inventors: Sanja Tepavcevic, Chicago, IL (US); Nigel Hajj Becknell, Glen Ellyn, IL (US); Pietro Papa Lopes, Woodridge, IL (US); Dusan Strmcnik, Lemont, IL (US); Vojislav Stamenkovic, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 68 days.

(21) Appl. No.: 16/778,175

(22) Filed: Jan. 31, 2020

(65) Prior Publication Data

US 2021/0242487 A1    Aug. 5, 2021

(51) Int. Cl.
| | |
|---|---|
| *H01M 10/054* | (2010.01) |
| *H01M 50/44* | (2021.01) |
| *H01M 50/411* | (2021.01) |
| *H01M 4/505* | (2010.01) |
| *H01M 4/62* | (2006.01) |
| *H01M 4/66* | (2006.01) |
| *H01M 4/587* | (2010.01) |

(52) U.S. Cl.
CPC ......... *H01M 10/054* (2013.01); *H01M 4/505* (2013.01); *H01M 4/587* (2013.01); *H01M 4/622* (2013.01); *H01M 4/661* (2013.01); *H01M 4/663* (2013.01); *H01M 4/669* (2013.01); *H01M 50/411* (2021.01); *H01M 50/44* (2021.01)

(58) Field of Classification Search
CPC .................................................. H01M 10/054
See application file for complete search history.

(56) References Cited

U.S. PATENT DOCUMENTS

| | | |
|---|---|---|
| 8,663,844 B2 | 3/2014 | Kang et al. |
| 2015/0287988 A1 | 10/2015 | Xu et al. |

OTHER PUBLICATIONS

Chen, Yanyi, et al. "Manganese Reduction/Oxidation Reaction on Graphene Composites as a Reversible Process for Storing Enormous Energy at a Fast Rate." arXiv, Oct. 2014, arxiv.org/abs/1410.4223.) (Year: 2014).*

(Continued)

*Primary Examiner* — Stephan J Essex
(74) *Attorney, Agent, or Firm* — Olson & Cepuritis, Ltd.

(57) ABSTRACT

An alternative grid energy storage system is described herein. In one embodiment, an electrochemical cell comprises a high specific surface area cathode (e.g., a cathode comprising a carbon nanofoam paper, a carbon nanotube mesh, a particulate carbon material, electrolytic manganese dioxide, or a manganese dioxide film), a zinc or lead anode (e.g., Zn or Pb foil), a selective ion-conductive separator that does not conduct zinc ions (e.g., a NAFION sulfonated tetrafluoroethylene based fluoropolymer-copolymer separator) between the anode and the cathode, and an aqueous electrolyte comprising a manganese salt (e.g., aqueous manganese sulfate) contacting the electrodes and the separator. A battery comprising two or more of the electrochemical cells electrically connected together in series, parallel, or both, also is described.

20 Claims, 4 Drawing Sheets

(56) References Cited

OTHER PUBLICATIONS

Alfaruqi, M. et al., Electrochemically Induced Structural Transformation in a γ-MnO2 Cathode of a High Capacity Zinc-Ion Battery System, Chem. Mater 27 (10), 3609-3620 (2015).

Alfaruqi, M. et al., Layered δ-MnO2 Nanoflake Cathode with High Zinc-Storage Capacities for Eco-Friendly Battery Applications, (English), Electrochemistry Communications 60; 121-125 (2015).

Chen, W. et al., A Manganese-Hydrogen Battery With Potential for Grid-Scale Energy Storage, Nature Energy 3, 428-435 (2018).

Li, G. et al., Membrane-Free Zn/MnO2 Flow Battery for Large-Scale Energy Storage, Advanced Energy Storage 10, 1-10 (2020).

Zhang, N. et al., Cation-Deficient Spinel ZnMn2O4 Cathode in Zn(CF3SO3)2 Electrolyte for Rechargeable Aqueous Zn-Ion Battery, Journal of the American Chemical Society 138 (39), 12894-12901 (2016).

\* cited by examiner

AQUEOUS MANGANESE ION BATTERY

STATEMENT OF GOVERNMENT INTEREST

The United States Government has rights in this invention pursuant to Contract No. DE-AC02-06CH11357 between the United States Government and UChicago Argonne, LLC representing Argonne National Laboratory.

FIELD OF THE INVENTION

This invention relates to manganese ion batteries. More particularly, this invention relates to manganese ion electrochemical cells and batteries utilizing an aqueous manganese ion electrolyte and a zinc anode.

BACKGROUND OF THE INVENTION

Energy storage batteries for electric grid applications require eco-friendly, safe, relatively inexpensive and abundant materials. In addition, such batteries should have high storage capacity and easy scalability to meet the demands of grid energy storage, as well as reliable charge-discharge cycling stability. A number of different battery designs have been utilized or proposed for grid energy storage, including, for example, lithium ion batteries, sodium ion batteries, flow batteries, zinc ion batteries, and molten-state batteries (e.g., liquid metal batteries, molten salt batteries, and sodium-sulfur batteries), to name a few. Many of these systems utilize toxic or flammable components, which raise safety and environmental concerns. Other systems suffer from low energy storage density, limited cycling lifetimes, or prohibitively expensive materials.

One aqueous battery technology with potential grid storage application is a zinc ion battery (ZIB). Aqueous battery systems typically utilized low toxicity active materials, non-flammable electrolytes and have high conductivity electrolytes, providing relatively high rates and power capabilities. A typical ZIB comprises a Zn anode, and a manganese dioxide cathode. The electrochemical reactions at the cathode comprise $MnO_2 + 0.5\ Zn^{2+} + e^- \rightarrow Zn_{0.5}MnO_2$; and at the anode comprise $Zn^0 \rightarrow Zn^{2+} + 2\ e^-$. ZIBs suffer from several drawbacks, however. For example, Zn intercalation into the $MnO_2$ cathode causes structural instabilities and formation of less active phases such as a $Zn_{0.5}MnO_2$ spinel phase. In addition, ZIB systems typically suffer from $Mn^{2+}$ dissolution.

Because all current battery technologies have advantages and disadvantages with respect to cost, sustainability, operational hazards, environmental hazards, and the like, there is an ongoing need for alternative grid energy storage technologies. The batteries described herein address this need.

SUMMARY OF THE INVENTION

An alternative energy storage system is described herein. In one embodiment, an electrochemical cell comprises a high surface area cathode (e.g., a cathode comprising a carbon nanofoam paper, a particulate carbon material, or manganese dioxide material such as electrolytic manganese dioxide or a film of manganese dioxide), a zinc or lead anode (e.g., Zn foil, zinc foam, or Pb foil), a selective ion-conductive separator which does not conduct zinc ions (e.g., a NAFION sulfonated tetrafluoroethylene based fluoropolymer-copolymer separator) between the anode and the cathode, and an aqueous electrolyte comprising a manganese salt (e.g., aqueous manganese sulfate) contacting the electrodes and the separator.

The cells can be connected in parallel, series, of both, to form a battery. In the electrochemical cells and batteries described herein the electrochemical discharge reactions at the cathode comprise $MnO_2 + 4\ H^+ + 2\ e^- \rightarrow Mn^{2+} = 2\ H_2O$. The electrochemical reactions at the anode comprise $Zn^0 \rightarrow Zn^{2+} + 2\ e^-$ or $Pb^0 \rightarrow Pb^{2+} + 2\ e^-$; with a theoretical cell voltage of about 1.9 V for Zn anode. The selective ion-conductive separator substantially blocks passage of zinc cations, which avoids Zn intercalation at the cathode, by preventing or minimizing zinc ion migration from the anode.

In some embodiments, the cathode comprises a high surface area cathode (e.g., a carbon nanofoam dispersed in a carbon fiber paper (referred to herein as a "carbon nanofoam paper"), a carbon nanotube mesh, or manganese dioxide dispersed in a carbon nanotube mesh, particulate manganese dioxide, or a particulate carbon material), preferably having an area-to-volume specific surface area greater than or equal to $10^6\ m^{-1}$. In some embodiments, the high surface area cathode has an area-to-volume specific surface area greater than or equal to $10^7\ m^{-1}$.

The aqueous manganese cells and batteries described herein are cost-effective, requiring simple fabrication techniques, and utilize environmentally benign chemical components. The cells have a relatively high rate capability and relatively high energy density, which provides a specific capacity of up to about 600 mAh/g.

The following non-limiting embodiments are provided below to illustrate certain aspects and features of the electrochemical cells and batteries described herein.

Embodiment 1 is an aqueous manganese ion electrochemical cell comprising a high specific surface area cathode, an anode, a selective ion-conductive separator between the anode and the cathode, and an aqueous electrolyte comprising a manganese salt contacting the anode, the cathode, and the separator; wherein the anode comprises metallic Zn or metallic Pb; the high specific surface area cathode has an area-to-volume specific surface area greater than or equal to $10^6\ m^{-1}$; and wherein the separator does not conduct zinc ions.

Embodiment 2 comprises the electrochemical cell of embodiment 1, wherein the cathode comprises at least one material selected from the group consisting of (a) a carbon nanofoam paper, (b) a carbon nanotube mesh, (c) nanoparticulate manganese dioxide dispersed in a carbon nanotube mesh, and (d) a particulate material coated on a current collector; wherein the particulate material comprises a particulate carbon material, a particulate manganese dioxide material, or a combination thereof.

Embodiment 3 comprises the electrochemical cell of embodiment 1 or 2, wherein the cathode comprises a nanoparticulate carbon material coated on a metal current collector.

Embodiment 4 comprises the electrochemical cell of any one of embodiments 1 to 3, wherein the cathode comprises at least one material selected from the group consisting of carbon nanotubes, carbon nanofibers, multi-walled carbon nanotubes, and graphene.

Embodiment 5 comprises the electrochemical cell of any one of embodiments 1 to 4, wherein the cathode comprises a carbon nanofoam paper.

Embodiment 6 comprises the electrochemical cell of any one of embodiments 1 to 5, wherein the cathode comprises a carbon nanofoam paper having an area-to-volume specific surface area greater than or equal to $1.5 \times 10^8\ m^{-1}$.

Embodiment 7 comprises the electrochemical cell of any one of embodiments 1 to 6, wherein the anode comprises metallic Zn.

Embodiment 8 comprises the electrochemical cell of any one of embodiments 1 to 7, wherein the manganese salt comprises manganese sulfate, manganese chloride, manganese nitrate, or a combination of two or more thereof.

Embodiment 9 comprises the electrochemical cell of any one of embodiments 1 to 8, wherein the manganese salt is present in the electrolyte at a concentration in the range of about 0.05 to about 5 molar (M).

Embodiment 10 comprises the electrochemical cell of any one of embodiments 1 to 9, wherein the separator comprises a sulfonated tetrafluoroethylene based fluoropolymer-copolymer.

Embodiment 11 comprises the electrochemical cell of any one of embodiments 1 to 10, wherein the cathode comprises a particulate carbon or manganese dioxide material coated on a current collector with a polymeric binder.

Embodiment 12 comprises the electrochemical cell of any one of embodiments 2 to 11, wherein the current collector comprises carbon or a metal.

Embodiment 13 comprises the electrochemical cell of any one of embodiments 2 to 12, wherein the current collector comprises stainless steel, aluminum or titanium.

Embodiment 14 is a battery comprising a plurality of electrochemical cells of any one of embodiments 1 to 12 electrically connected together in series, in parallel, or in both series and parallel.

DETAILED DESCRIPTION

Figure 1:
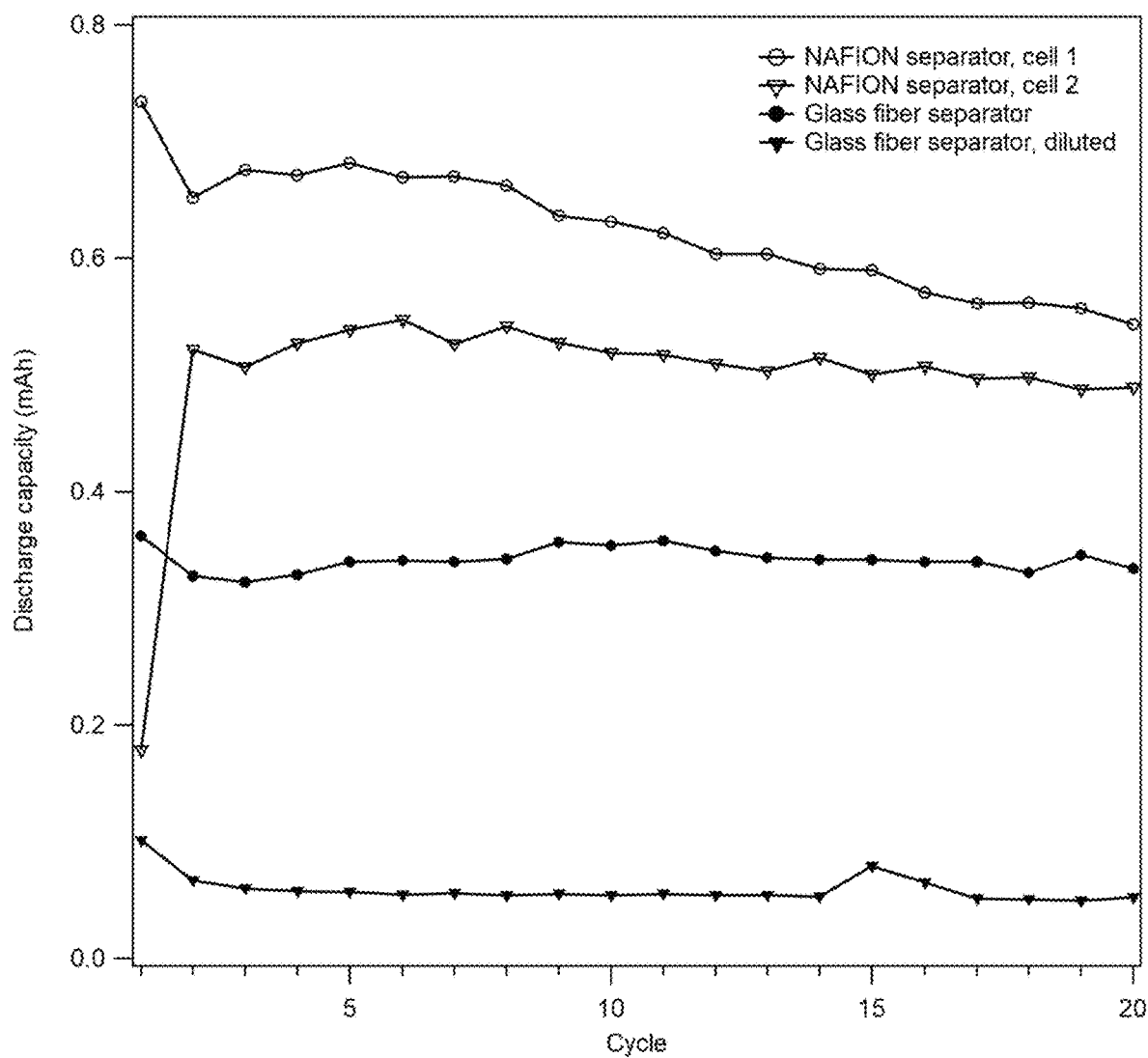
FIG. 1 provides plots of capacity versus cycle number for coin cells of manganese ion batteries.

The aqueous manganese cells and batteries described herein provide an eco-friendly alternative to existing large scale energy storage systems.

The cathode of the electrochemical cell comprises a high surface area conductive material such as a carbon nanofoam paper, a particulate carbon material, a particulate manganese dioxide, or a combination of a particulate carbon material and a particulate manganese dioxide material. As used herein the phrase "high surface area" refers to a material having an area-to-volume (e.g., $m^2/m^3$) specific surface area of greater than or equal to $10^6$ $m^1$ (e.g., greater than or equal to $10^7$ $m^1$). The particulate carbon or manganese dioxide preferably is coated on a current collector (e.g., carbon or a metal such as a stainless steel, aluminum, or titanium) using a polymeric binder. Examples of suitable binders include polyvinylidene difluoride (PVDF), carboxymethylcellulose (CMC), polyacrylic acid (PAA), and the like, to aid in adhering the active materials to the current collectors. Typically, the carbon or manganese dioxide is coated on the current collector at a loading of about 1 to about 30 g carbon per square meter and 0 to about 500 g manganese dioxide per square meter, with about 0 to about 30 percent by weight (wt %) of the binder (based on the weight of the carbon and/or manganese dioxide).

In some embodiments, the cathode comprises a carbon nanofoam paper. Carbon nanofoam is an allotrope of carbon, which comprises carbon tendrils bonded together in a low-density foam arrangement. Preferably the carbon nanofoam paper has an area-to-volume specific surface area greater than or equal to $1.5 \times 10^8$ $m^{-1}$. In some other embodiments, the cathode comprises a carbon nanotube mesh (e.g., deposited on a glass fiber substrate) or a nanoparticulate manganese dioxide dispersed in such a carbon nanotube mesh.

In some other embodiments, the cathode comprises a particulate carbon material. Preferably the particulate carbon material comprises carbon nanoparticles or microparticles. As used herein, the term "nanoparticle" refers to particles in the range of about 1 to about 100 nanometers (nm) in average size. Examples of suitable carbon materials include, e.g., carbon nanotubes such as single-walled carbon nanotubes, multi-walled carbon nanotubes, carbon nanofibers, and graphene. The term nanotube refers to tubular carbon materials with a tubular diameter in the range of about 0.4 to about 100 nm, which can have lengths of 1 nm to 1 micrometer, or more. Single-walled carbon nanotubes typically have a tubular wall that has a thickness of a single carbon atom, while multi-walled nanotubes have tubular walls with several nested layers of carbon. The term nanofiber refers to fibrous carbon materials with a fiber diameter in the range of about 50 to about 200 nm, which typically can have lengths of about 1 to 200 micrometers. Preferably, the particulate material is coated on a current collector (e.g., carbon, or a metal such as stainless steel, aluminum, titanium, and the like.)

The anode comprises metallic zinc or lead. For example, the anode can be a zinc rod or bar, a zinc sheet, a zinc foil, a zinc foam, a lead rod or bar, a lead sheet, a lead foil, a lead foam, and the like. Preferably, the anode comprises zinc.

The electrolyte comprises an aqueous solution of a manganese salt. Typically, the manganese salt is present in the electrolyte at a concentration of about 0.05 to about 5 M. In some embodiments, the manganese salt is present in the electrolyte at a concentration of about 0.05 to about 0.5 M, or about 0.5 to about 3.5 M. Any manganese salt can be utilized in the electrolyte, such as, for example, manganese sulfate, manganese chloride, manganese nitrate, and the like.

Optionally, the electrolyte can include one or more additive to improve cycling efficiency, coulombic efficiency, specific capacity, reduce dendrite formation, or other useful properties. Non-limiting examples of such additives include, e.g., thiourea (TU) which has been reported to improve coulombic efficiency in some aqueous batteries; gelling agents such as hydrophilic silica nanoparticles, β-cyclodextrin, and fumed silica which have been reported to boost specific capacity, rate capability and cycling stability is some aqueous batteries; surfactants (e.g., anionic, nonionic, cationic and zwitterionic surfactants), such as sodium dodecylsulfate (SDS), polyethylene glycol (PEG), and cetyltrimethylammonium bromide (CTAB) which have been reported to reduce dendrite formation at zinc electrodes in some aqueous batteries; and the like.

The separator is a zinc ion-impermeable, ion-conducting membrane or film (e.g., proton-conducting, anion-conducting, and the like) that allows selected ions to pass through the membrane or film to balance the electrical charges formed at the anode and cathode during charging and discharging of the cell, while preventing passage of zinc ions to the cathode. The separator can be any ion-conductive material that does not conduct zinc ions. Non-limiting examples of such materials include, e.g., a fluorinated ionomer (such as a NAFION sulfonated tetrafluoroethylene based fluoropolymer-copolymer), a sulfonated polyether ether ketone (S-PEEK), a polybenzimidazole (PBI) membrane doped with a strong mineral acid, an interpenetrating network of polybenzimidazole (PBI) and poly vinylphosphonic acid, a proton-conducting ceramic film (e.g., barium zirconates ($BaZrO_3$) or cerates ($BaCeO_3$) doped with an acceptor ion such as yttrium), an anion exchange membrane (e.g., FUMASEP FAP-450, which according to the manufacturer, FuMA-Tech, is a non-reinforced fluorinated anion exchange membrane (AEM) with low resistance, high blocking capability of vanadium ions, and high stability in acidic environment), and the like.

The electrochemical cell can be embodied in a number of different battery configurations, such as coin cells, cylindrical cells, prismatic cells, pouch cells, flow cells, fuel cells, and the like.

The following non-limiting examples are provided to illustrate certain aspects and features of the methods described herein.

Example 1

Coin cells were constructed from a stainless steel coin cell casing containing stainless steel spacers and spring to provide adequate pressure of the coin cell layers. The anode consisted of a zinc disk. A glass fiber disk was placed in contact with the zinc disk and soaked with electrolyte containing either only $Mn^{2+}$ ions, both $Mn^{2+}$ and $Zn^{2+}$ ions, or only $Zn^{2+}$ ions. This glass fiber disk was sometimes covered with a NAFION 211 membrane. In some cases, only glass fiber was used. Another glass fiber disk was placed on the cathode side of the NAFION membrane and was soaked with electrolyte containing only $Mn^{2+}$ ions. A carbon-based cathode was then placed on or supported on this glass fiber disk. The entire coin cell was sealed with an electronic crimper. The cathodes that were evaluated include a carbon nanofoam paper, which has a specific surface area of greater than or equal to $1.5 \times 10^8$ $m^{-1}$; a carbon nanotube mesh supported on the cathode-side glass fiber disk, and nanoparticulate manganese dioxide dispersed in a carbon nanotube mesh supported on the cathode-side glass fiber disk.

The electrochemical properties of the coins cells were evaluated by cycling them at a specified current between 0.01 to 1 mA and between a specified voltage range within 0 to 2.5 V vs the $Zn/Zn^{2+}$ reference electrode.

FIG. 1 provides plots of capacity versus cycle number for four coin cells made with carbon nanotube mesh cathodes, aqueous manganese sulfate electrolyte, a zinc anode, and either a NAFION separator (top two plots) or a glass fiber separator (bottom two plots). The results in FIG. 1 show that capacity is decreased by diluting the manganese sulfate electrolyte, because there is less manganese to be electrodeposited as manganese dioxide. The results also show that capacity is increased when the glass fiber separator is replaced by a NAFION separator, because the NAFION polymer prevents $Zn^{2+}$ crossover from the anode to the cathode.

Figure 2:
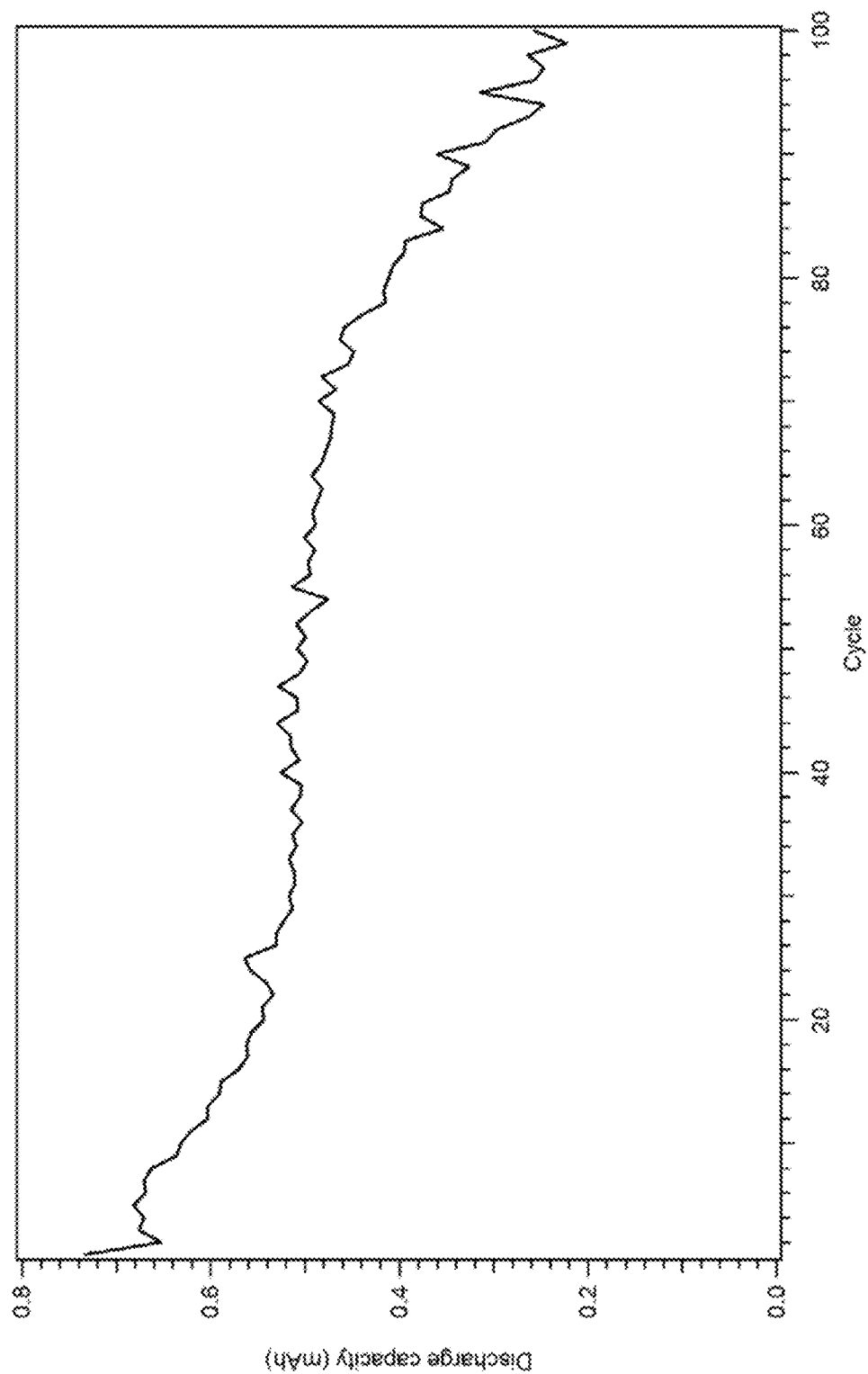
FIG. 2 provides a plot of capacity versus cycle number for a coin cell of a manganese ion battery.

FIG. 2 provides a plot of capacity versus cycle number for a coin cell made with a carbon nanotube mesh cathode, aqueous manganese sulfate electrolyte, a zinc anode, and a NAFION separator. The results in FIG. 2 show that the coin cell can be cycled at least 100 times.

Figure 3:
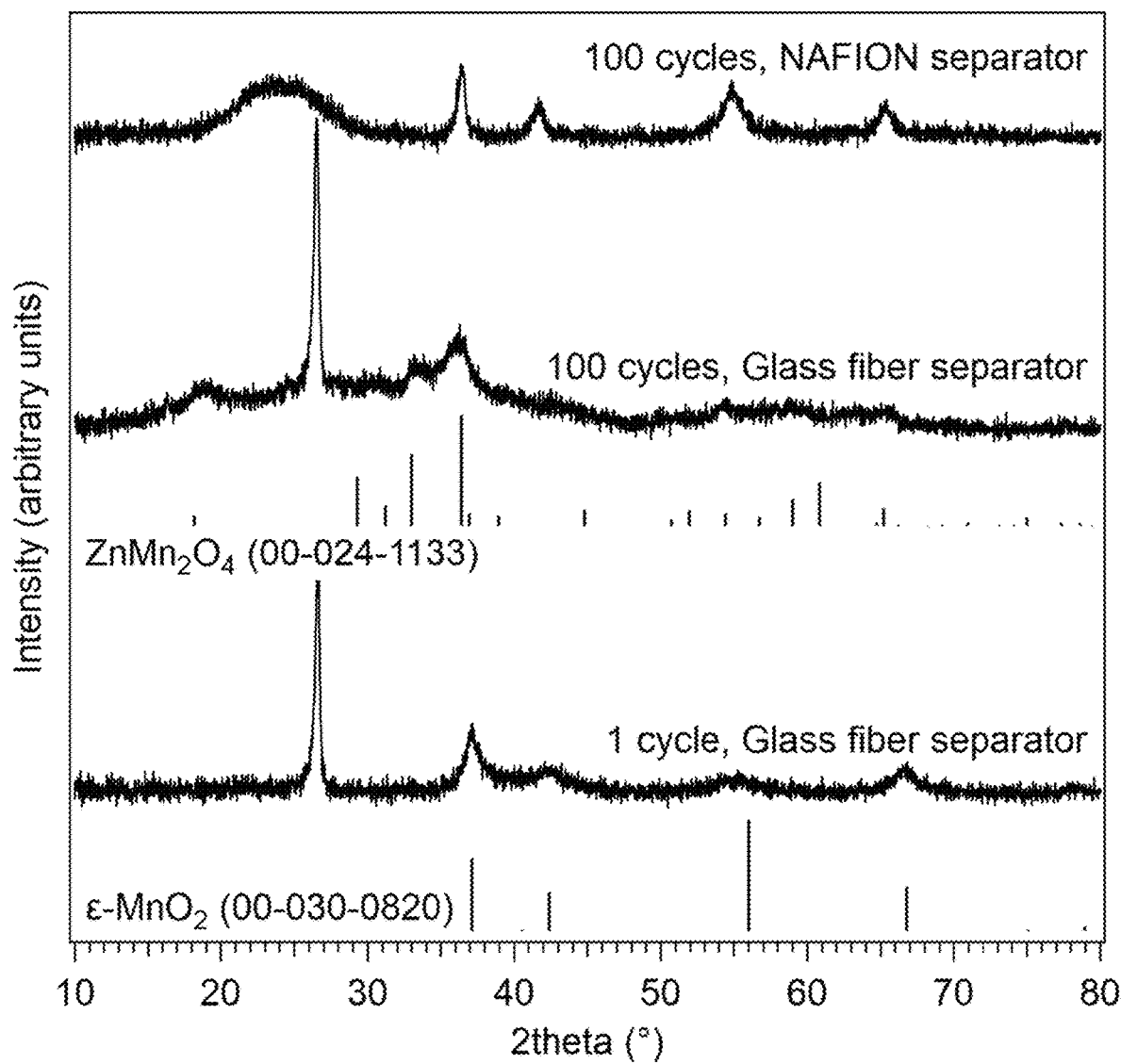
FIG. 3 provides plots of X-ray diffraction of the cathode after cycling of manganese ion batteries.

FIG. 3 provides plots of X-ray diffraction of the cathode for three disassembled coin cells that were made with a carbon nanofoam paper cathode (top plot) and carbon nanotube mesh cathodes (bottom two plots), sulfate electrolyte, a zinc anode, and a either a NAFION separator (top plot) or glass fiber separators (bottom two plots). The results in FIG. 3 show that when a glass fiber separator is used, after 1 cycle, only manganese dioxide ($\epsilon$-$MnO_2$) exists on the cathode, but after 100 cycles, $Zn^{2+}$ has crossed from the anode to the cathode, forming a $ZnMn_2O_4$ phase. However, when a NAFION separator is used, after 100 cycles $Zn^{2+}$ crossover is prevented and only manganese dioxide ($\epsilon$-$MnO_2$) exists on the cathode.

Example 2

Figure 4:
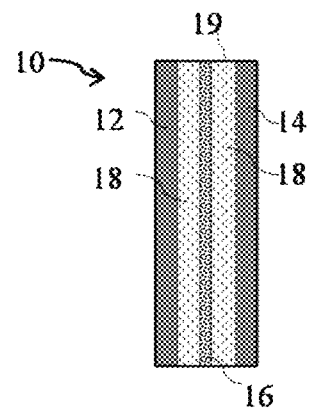
FIG. 4 schematically illustrates an aqueous Mn-ion electrochemical cell.
Figure 5:
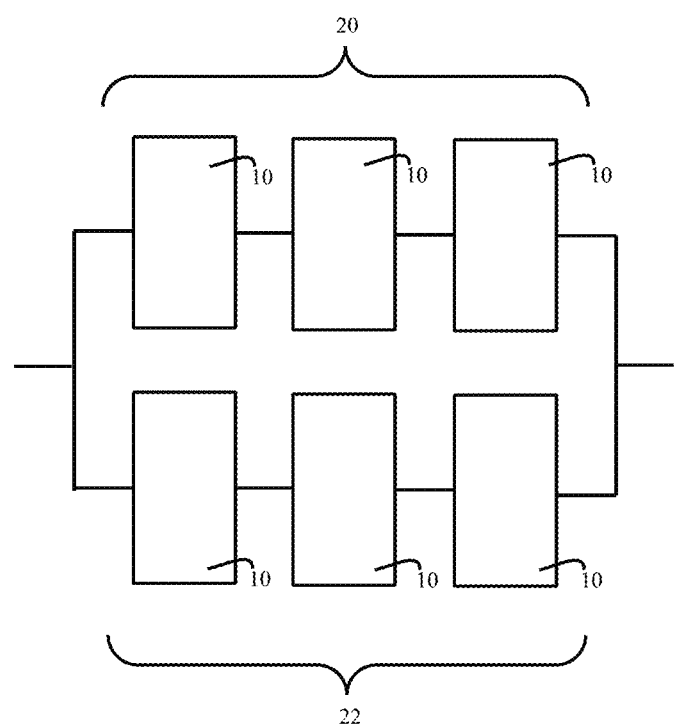
FIG. 5 schematically illustrates an aqueous Mn-ion battery.

FIG. 3 schematically illustrates a cross-sectional view of manganese-ion electrochemical cell 10 comprising high surface area cathode 12, and Zn or Pb anode 14, with separator 16 therebetween. Mn-containing aqueous electrolyte 18, comprising a solution of a manganese salt in an water, contacts electrodes 12 and 14 and separator 16. The electrodes, separator and electrolyte are sealed within housing 19. FIG. 4 schematically illustrates a lithium-ion battery comprising a first array 20 consisting of three series-connected electrochemical cells 10, and a second array 22 consisting of three series-connected electrochemical cells 10, in which first array 20 is electrically connected to second array 22 in parallel.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. An aqueous manganese ion electrochemical cell comprising a high specific surface area cathode, an anode, a selective ion-conductive separator between the anode and the cathode, and an aqueous electrolyte comprising a manganese salt contacting the anode, the cathode, and the separator; wherein the anode comprises metallic Zn or metallic Pb; the cathode has an area-to-volume specific surface area greater than or equal to $10^6$ m$^{-1}$; and wherein the separator does not conduct zinc ions, thereby preventing the passage of zinc ions from the anode to the cathode.

2. The electrochemical cell of claim 1, wherein the cathode comprises at least one material selected from the group consisting of (a) a carbon nanofoam paper, (b) a carbon nanotube mesh, (c) nanoparticulate manganese dioxide dispersed in a carbon nanotube mesh, and (d) a particulate material coated on a current collector; wherein the particulate material comprises a particulate carbon material, a particulate manganese dioxide material, or a combination thereof.

3. The electrochemical cell of claim 1, wherein the cathode comprises a nanoparticulate carbon material coated on a metal current collector.

4. The electrochemical cell of claim 3, wherein the nanoparticulate carbon material comprises at least one material selected from the group consisting of carbon nanotubes, carbon nanofibers, multi-walled carbon nanotubes, and graphene.

5. The electrochemical cell of claim 1, wherein the cathode comprises a carbon nanofoam paper.

6. The electrochemical cell of claim 5, wherein the carbon nanofoam paper has an area-to-volume specific surface area greater than or equal to $1.5 \times 10^8$ m$^{-1}$.

7. The electrochemical cell of claim 1, wherein the anode comprises metallic Zn.

8. The electrochemical cell of claim 1, wherein the manganese salt comprises manganese sulfate, manganese chloride, manganese nitrate, or a combination of two or more thereof.

9. The electrochemical cell of claim 1, wherein the manganese salt is present in the electrolyte at a concentration in the range of about 0.05 to about 5 molar (M).

10. The electrochemical cell of claim 1, wherein the separator comprises a sulfonated tetrafluoroethylene based fluoropolymer-copolymer.

11. The electrochemical cell of claim 2, wherein the particulate material is coated on the current collector with a polymeric binder.

12. The electrochemical cell of claim 1, wherein the current collector comprises carbon or a metal.

13. The electrochemical cell of claim 1, wherein the current collector comprises stainless steel, aluminum, or titanium.

14. An aqueous manganese ion electrochemical cell comprises a cathode, an anode, a selective ion-conductive separator between the anode and the cathode, and an aqueous electrolyte comprising a manganese salt contacting the anode, the cathode, and the separator; wherein the anode comprises metallic Zn; the cathode comprises at least one material selected from the group consisting of (a) a carbon nanofoam paper, (b) a carbon nanotube mesh, (c) nanoparticulate manganese dioxide dispersed in a carbon nanotube mesh, and (d) a particulate material coated on a current collector; wherein the particulate material comprises a particulate carbon material, a particulate manganese dioxide material, or a combination thereof; and wherein the separator does not conduct zinc ions, thereby preventing the passage of zinc ions from the anode to the cathode.

15. The electrochemical cell of claim 14, wherein the cathode has an area-to-volume specific surface area greater than or equal to $10^6$ m$^{-1}$.

16. The electrochemical cell of claim 14, wherein the manganese salt is present in the electrolyte at a concentration in the range of about 0.05 to about 5 M.

17. The electrochemical cell of claim 14, wherein the separator comprises a sulfonated tetrafluoroethylene based fluoropolymer-copolymer.

18. The electrochemical cell of claim 14, wherein the cathode comprises at least one particulate carbon material selected from the group consisting of carbon nanotubes, multi-walled carbon nanotubes, carbon nanofibers, and graphene.

19. A battery comprising a plurality of electrochemical cells of claim 1 electrically connected together in series, in parallel, or in both series and parallel.

20. A battery comprising a plurality of electrochemical cells of claim 14 electrically connected together in series, in parallel, or in both series and parallel.

* * * * *